(12) United States Patent
Mendoza et al.

(10) Patent No.: US 6,898,895 B2
(45) Date of Patent: May 31, 2005

(54) FISH HOOK HAVING AN OPERABLE AUXILIARY HOOK ASSEMBLY

(76) Inventors: George Mendoza, 5780 SW. Impala La., Redmond, OR (US) 97756; John Rae, 18160 Cottonwood Rd., Sunriver, OR (US) 97707

( * ) Notice: Subject to any disclaimer, the term of this patent is extended or adjusted under 35 U.S.C. 154(b) by 0 days.

(21) Appl. No.: 10/665,814

(22) Filed: Sep. 17, 2003

(65) Prior Publication Data

US 2005/0055867 A1 Mar. 17, 2005

(51) Int. Cl.⁷ ............................................. A01K 83/00
(52) U.S. Cl. ..................... 43/44.82; 43/43.16
(58) Field of Search .................. 43/44.82, 44.8, 43/43.4, 43.16, 44.2

(56) References Cited

U.S. PATENT DOCUMENTS

| | | | |
|---|---|---|---|
| 70,913 A * | 11/1867 | Sterling | 43/44.8 |
| 2,608,791 A * | 9/1952 | Wentz | 43/44.2 |
| 2,668,387 A * | 2/1954 | Gallardo | 43/44.4 |
| 2,710,481 A * | 6/1955 | Matthes | 43/44.8 |
| 2,908,990 A * | 10/1959 | Rimbach | 43/44.82 |
| 3,027,677 A * | 4/1962 | Low | 43/44.82 |
| 3,905,149 A * | 9/1975 | McCloud | 43/44.2 |
| 4,557,065 A * | 12/1985 | Rye | 43/43.16 |
| 6,038,806 A * | 3/2000 | Maitland | 43/4.5 |
| 6,560,917 B2 * | 5/2003 | Van Der Hoven et al. | 43/43.4 |
| 6,739,085 B1 * | 5/2004 | Burczynski | 43/43.16 |
| 6,766,608 B1 * | 7/2004 | Jelmyer | 43/44.2 |

* cited by examiner

*Primary Examiner*—Peter M. Poon
*Assistant Examiner*—Bethany L. Griles
(74) *Attorney, Agent, or Firm*—Glenn C. Brown, P.C.

(57) ABSTRACT

A fish hook assembly including a conventional hook and an auxiliary hook mounted on the conventional hook. The auxiliary hook includes an operable member that engages the mouth of the fish responsive to the fish biting the hook assembly.

24 Claims, 3 Drawing Sheets

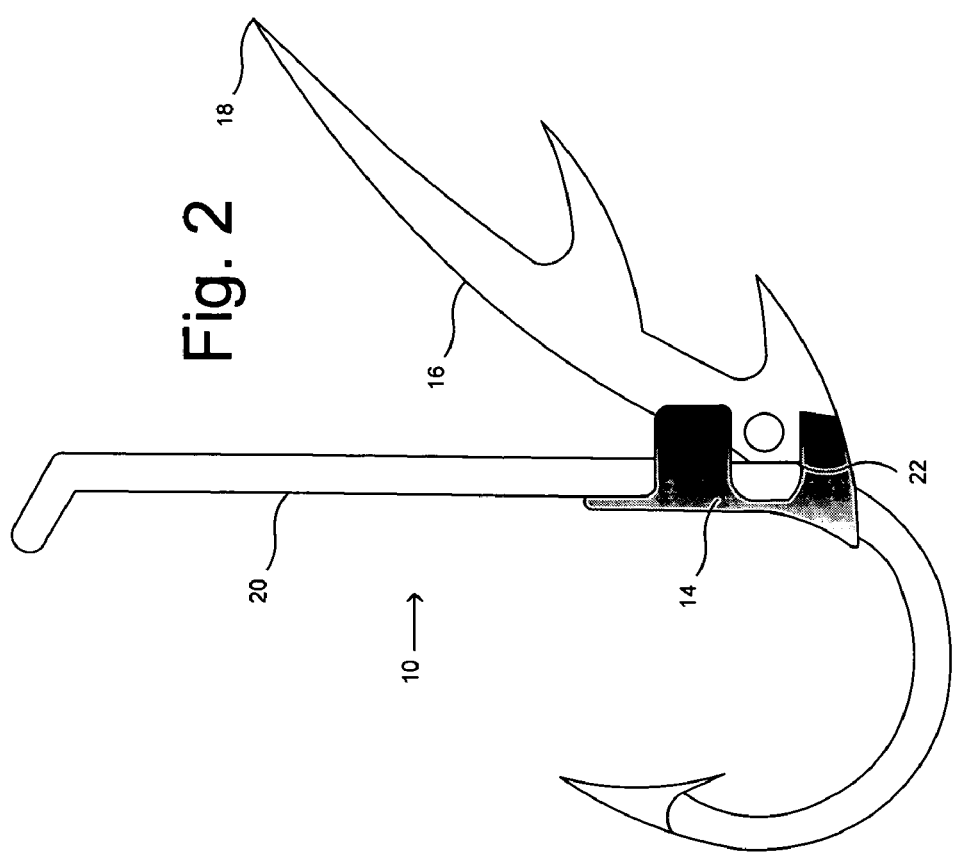
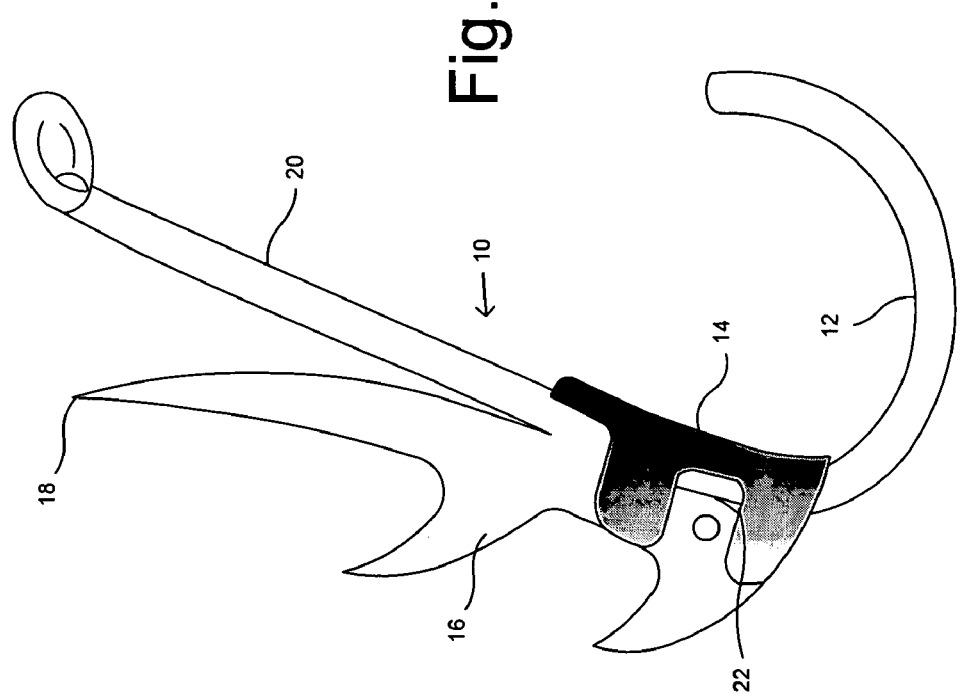

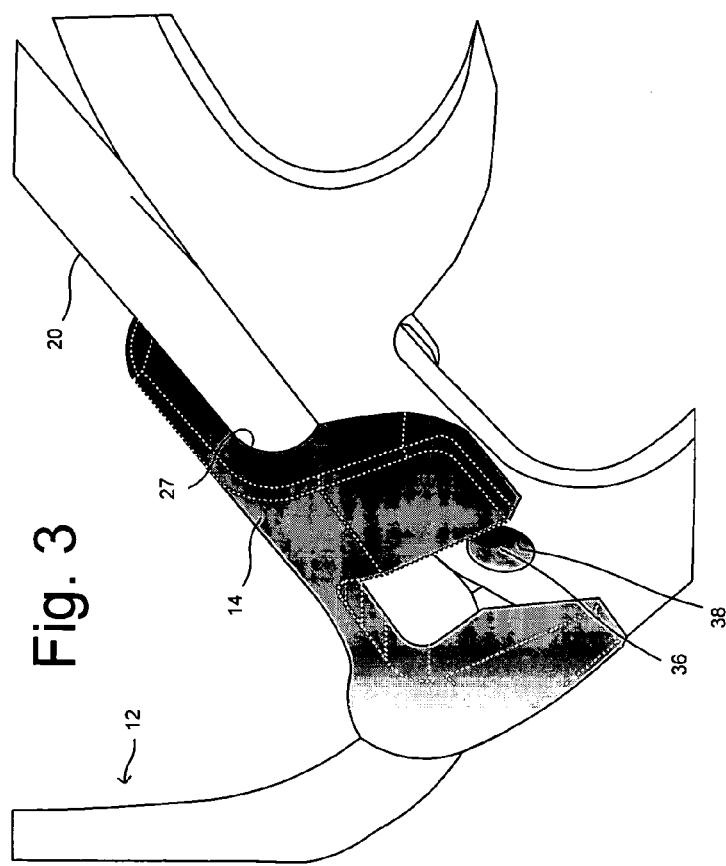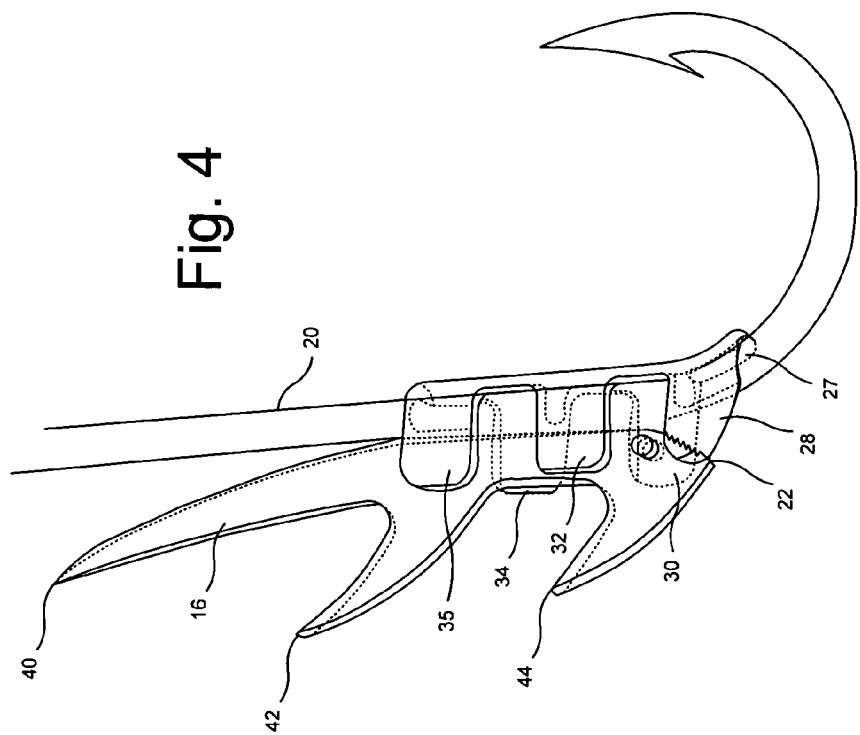

FISH HOOK HAVING AN OPERABLE AUXILIARY HOOK ASSEMBLY

BACKGROUND OF THE INVENTION

This invention relates to fish hooks, and in particular to a fish hook assembly having a primary pointed shank and an auxiliary hook assembly that is operable to deploy and embed a pointed portion in the mouth of the fish to further secure the fish to the hook.

Ever since the days of sharpened bone fish hooks fishermen have pondered the problem of a fish spitting the hook and freeing itself after having been initially hooked. The prior art discloses many fish hooks that purport to address this problem in one way or another. Barbs were added to the pointed end of the hook to resist the pulling of the embedded hook from the fish's mouth. Gang hooks were developed that result in multiple hooks becoming embedded in the fish's mouth. These two innovations have been widely accepted and have been so successful that in areas where fish conservation efforts are paramount, barbed hooks and gang hooks are sometimes prohibited. Even these two advances have not completely eliminated the problem of a fish spitting the hook however, and in a relentless effort to tilt the scales in favor of the fisherman, other solutions have been proposed. None has gained wide acceptance however; some because they simply haven't worked and others because they are too complicated or expensive. A need remains therefore for simple, inexpensive fish hook that more effectively blunts the efforts of the fish to free itself from the hook.

SUMMARY OF THE INVENTION

This invention provides a fish hook that more effectively hooks the fish and helps prevent the loss of a trophy or a meal. The invention is embodied in a fish hook assembly that includes a primary curved hook of conventional design on which is mounted an auxiliary hook assembly. The auxiliary hook assembly includes a base which connects to the shank of the conventional hook and an operable auxiliary hook member that moves from a first retracted position to a second deployed position when a fish strikes. In some preferred embodiments the base includes a channel with spaced apart tabs extending from the upper portion of the channel. The shank of the primary hook snaps into the channel and is held in place by the resilient channel walls and the spaced apart tabs. An operable auxiliary hook is pivotably mounted on the base, in some embodiments on one of the tabs, in others at a different position on the base. The auxiliary hook resides normally in its first retracted position in which the pointed end is adjacent the primary hook shank. When deployed the auxiliary hook is positioned away from the primary hook shank, with the pointed end angled farther away from the shank than in the retracted position. The auxiliary hook is preferably a molded or die cut member that includes additional points in addition to the pointed end. The auxiliary hook is moved from the retracted to the deployed condition by the mouth of a fish when it takes bait presented on the primary hook and/or the auxiliary hook. This action results from the pulling of the hook away from the eye end of the primary hook, causing the pointed end to move along its radius outward from the shank of the primary hook and more securely hooking the fish to the hook assembly.

These and other features of the invention will be described in greater detail by reference to the drawings.

BRIEF DESCRIPTION OF THE DRAWINGS

FIG. 1 is a perspective view of a preferred embodiment of a hook assembly according to the invention with the auxiliary hook in its retracted position.

FIG. 2 is a perspective view of a preferred embodiment shown in FIG. 1 but with the auxiliary hook in its deployed position.

FIG. 3 is a partial enlarged view of the preferred embodiment shown in FIG. 1, and showing the base and pivotal attachment of the operable member on the base.

FIG. 4 is a partial cutaway view of the embodiment shown in FIG. 1.

DETAILED DESCRIPTION

Figure 6:
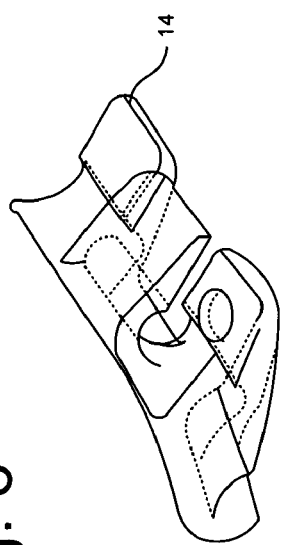
FIG. 6 is a partial cutaway view of the base member, and showing the channel formed in the base and the tabs that together form the resilient channel.
Figure 7:
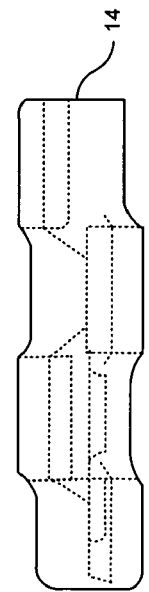
FIG. 7 is a top view of the base member shown in FIG. 6.

Referring now to FIGS. 1 and 2, a hook assembly according to the invention is shown generally at 10, and includes a primary hook 12 of conventional design, an auxiliary hook base member 14, and a pivotably mounted operable member 16. Operable member 16 is operable from its retracted position shown in FIG. 1 to a deployed position as shown in FIG. 2. Member 16 deploys to its second deployed position when a fish closes its mouth around and pulls on the hook assembly. The pointed end 18 of the operable member 16 penetrates the mouth of the fish, and as the fish pulls against the hook the operable member 16 pivots outwardly from shank 20 following an arced path defined by the pivotal mounting point of the operable member to the base. The operable member 16 continues along the arced path until surface 22 engages the shank 20 and prevents further movement. At this point, the primary hook 12 and the pointed end of the auxiliary hook operable member 16 are both embedded in the mouth of the fish, making it less likely that the fish will shake the hook.

Figure 5:
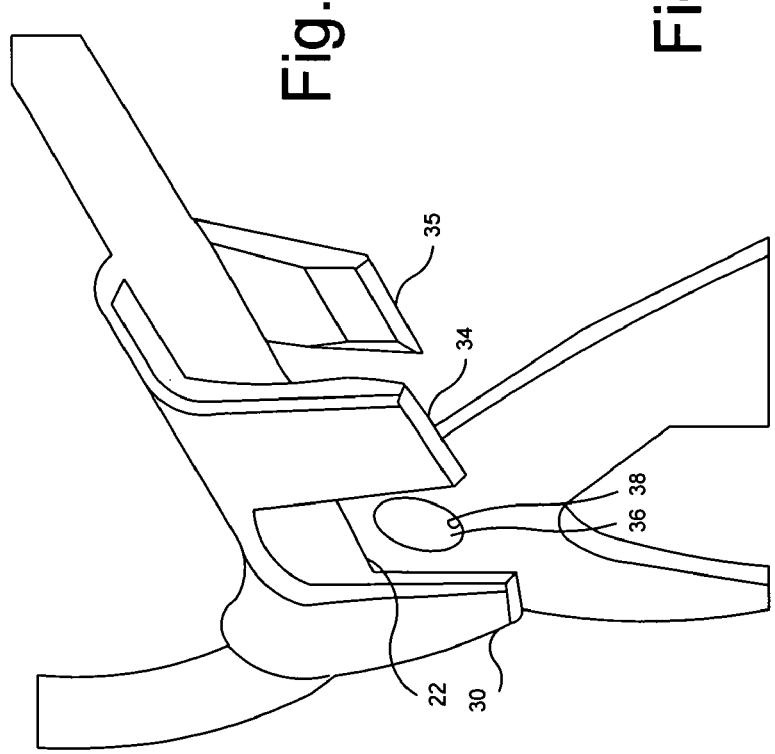
FIG. 5 is a partial enlarged view of the embodiment shown in FIG. 2, and showing in greater detail the base and pivoting member with the auxiliary hook in the deployed position.

Referring to FIGS. 3–6, in one preferred embodiment the base member 14 includes a bottom portion 26 with 4 spaced-apart tabs 28–34 which cooperatively define a channel 27 that is sized and shaped to receive the shank 20 of a conventional fish hook. The base member is formed of a resilient thermoplastic material that permits the tabs to be spread to receive the shank 20 and to then permit the operable member 16 to be mounted on post 36, which is best seen in FIGS. 3 and 4. Operable member 16 includes a hole 38 by which it is mounted onto post 36. Operable member 16 is formed of a thermoplastic or metal, and is preferably molded or stamped for economical manufacture. In addition to a pointed end 40, member 16 can additionally include secondary points 42 and 44 to enhance its fish hooking ability.

Operable member 16 normally resides in its retracted position as shown in FIGS. 1 and 3. It is retained in that position by a light frictional engagement of the tabs to the sides of the operable member 16. The frictional engagement is selected to retain the operable member 16 with a light retaining force, but to permit the operable member to rotate outward responsive to a relatively light force of a light bite by a fish.

While the invention has been described by reference to the illustrated embodiments, the description is intended to describe but not to limit the invention. Those of skill in the art will recognize that numerous changes in detail and arrangement are possible without departing from the scope of the invention as defined by the following claims.

What is claimed is:

1. A fish hook comprising:
   a. a shank having a first end and a second pointed end;
   b. an operable member having a base and a pointed pivoting member mounted on the base, the pointed pivoting member operable between a first retracted position adjacent the shank and a second extended position away from the shank;
   c. the base having surfaces defining a channel and the shank clampingly received in the channel; and
   d. the pointed member operable from the first position to the second position responsive to engagement of the fish hook with a mouth of a fish.

2. A fish hook according to claim 1 wherein the operable member further comprises at least one surface frictionally engaging the pointed member.

3. A fish hook according to claim 2 wherein the at least one surface frictionally engaging the pointed member includes at least one member extending from the base.

4. A fish hook according to claim 3 wherein the at least one extending member includes at least two spaced apart tabs.

5. A fish hook according to claim 3 wherein the pivoting member is pivotably mounted in at least one of the at least one member extending from the base.

6. A fish hook according to claim 1 further comprising the pointed member having a pointed distal end angled away from the shank.

7. A fish hook according to claim 1 wherein the channel is a rounded channel resiliently clamping the shank.

8. A fish hook according to claim 1 wherein the channel clamps a curved portion of the shank.

9. A fish hook according to claim 1 further comprising the pointed member having a plurality of sharpened points.

10. A fish hook according to claim 1 further comprising an over center surface that resists movement of the pivoting member from the extended position to the retracted position.

11. A fish hook according to claim 1 further comprising engageable surfaces that, when engaged, limit the movement of the pivoting member.

12. A fish hook according to claim 2 wherein the at least one surface frictionally engaging the pivoting member includes surfaces defining a slot in communication with the channel.

13. A fish hook according to claim 1 wherein the operable member further comprises at least one surface frictionally engaging the operable member.

14. An auxiliary member for mounting on a fish hook;
   a. an operable member having a base and a pointed pivoting member mounted on the base, the pointed pivoting member operable between a first retracted position adjacent the shank and a second extended position away from the shank;
   b. the base having surfaces defining a channel sized for clampingly receiving a shank portion of the fish hook; and
   c. the pointed member operable from the first position to the second position responsive to engagement of the fish hook with a mouth of a fish.

15. A fish hook according to claim 14 wherein the at least one surface frictionally engaging the operable member includes at least one member extending from the base.

16. A fish hook according to claim 15 wherein the at least one extending member includes at least two spaced apart tabs.

17. A fish hook according to claim 15 wherein the operable member is pivotably mounted in at least one of the at least one member extending from the base.

18. A fish hook according to claim 14 further comprising the pointed member having a pointed distal end angled away from the shank.

19. A fish hook according to claim 14 wherein the channel is a rounded channel resiliently clamping the shank.

20. A fish hook according to claim 14 wherein the channel clamps a curved portion of the shank.

21. A fish hook according to claim 14 further comprising the pointed member having a plurality of sharpened points.

22. A fish hook according to claim 14 further comprising an over center surface that resists movement of the pivoting member from the extended position to the retracted position.

23. A fish hook according to claim 14 further comprising engageable surfaces that, when engaged, limit the movement of the pivoting member.

24. A fish hook according to claim 15 wherein the at least one surface frictionally engaging the pivoting member includes surfaces defining a slot in communication with the channel.

* * * * *